Feb. 6, 1962  R. R. BOCKEMUEHL  3,019,984
ELECTRONIC MULTIPLYING CIRCUIT
Filed Nov. 29, 1957

INVENTOR.
Robert R. Bockemuehl
BY
E. W. Christen
ATTORNEY 3,019,984
ELECTRONIC MULTIPLYING CIRCUIT
Robert R. Bockemuehl, Birmingham, Mich., assignor to General Motors Corporation, Detroit, Mich., a corporation of Delaware
Filed Nov. 29, 1957, Ser. No. 700,256
7 Claims. (Cl. 235—194)

This invention relates to electronic circuits and more particularly to a circuit for performing the mathematical operation of multiplication.

In numerous applications, it is desired to develop a signal voltage or current corresponding to the product of two or more data quantities for use in measuring, control, or computing systems. The data quantities such as variable physical conditions may be converted into electrical signals by means of suitable transducers. In accordance with this invention, multiplication is performed by developing a signal voltage having an amplitude corresponding to one data quantity and having a frequency corresponding to the other data quantity. This is suitably accomplished by an auction cathode follower with one data signal applied to one pair of input terminals and the other data signal applied to the other pair of input terminals. The developed signal voltage is then integrated to obtain an output signal voltage corresponding to the product of the frequency and the amplitude thereof. The integration is suitably performed by a count rate circuit and the output signal voltage is further amplified as desired and applied to any suitable utilization means. A typical example is that of developing an electrical signal corresponding to mechanical horsepower as the product of a signal voltage having a frequency proportional to revolutions per minute and a signal voltage having an amplitude proportional to torque.

A more complete understanding of the invention may be had from the detailed description which follows taken with the accompanying drawings in which.

Figure 1:
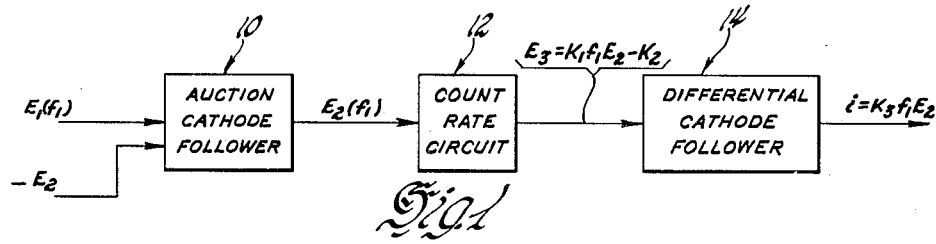
FIGURE 1 is a block diagram of the multiplier circuit.
Figure 2:
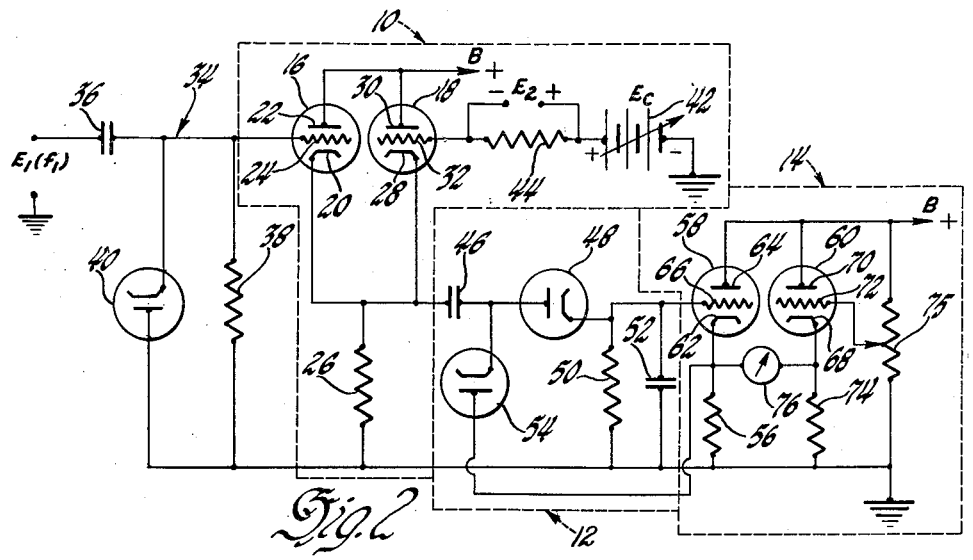
FIGURE 2 is a schematic diagram of the multiplier circuit.

Referring now to the drawings, there is shown in FIGURES 1 and 2 an illustrative embodiment of the invention for developing an output voltage and current corresponding to the product of the amplitude of one signal voltage and the frequency of another signal voltage. As shown in FIGURE 1, a signal voltage source $E_1(f_1)$ develops a voltage of constant amplitude $E_1$ and variable frequency $f_1$ corresponding to the value of one varaible data quantity. This signal voltage, as indicated, is connected to one set of input terminals of the auction cathode follower 10. A signal voltage source $-E_2$ develops a direct current voltage having an amplitude $-E_2$ corresponding to the value of another variable data quantity and is connected across the other set of input terminals of the auction cathode follower 10. The auction cathode follower operates to develop an output voltage $E_2(f_1)$ having a variable amplitude $E_2$ and a variable frequency $f_1$ and this voltage is applied across the input terminals of the count rate circuit 12. The circuit 12 operates to integrate the input voltage and develops an output voltage $E_3$ having a component proportional to the product of the variable frequency $f_1$ and the variable voltage $E_2$ and may have an additional component of constant value $k_2$. In order to develop a usable output current, the voltage $E_3$ is applied across the input terminals of a differential cathode follower 14 which operates to eliminate the constant component $k_2$ and to develop an output current $i$ corresponding to the product of the variable frequency $f_1$ and the variable voltage $E_2$.

The details of the multiplying circuit will be described with reference to FIGURE 2. The auction cathode follower 10 is of conventional design and comprises a pair of amplifying devices such as electron tubes 16 and 18. The tube 16 includes a cathode 20, a plate 22 and a grid 24. The output circuit of the tube extends between the cathode 20 and plate 22 and includes a cathode resistor 26 connected between the cathode 20 and ground and a plate supply voltage source B+ connected between ground and the plate 22. To provide a cathode follower circuit configuration, the input terminals of the tube 16 are the grid 24 and ground. Similarly, tube 18 includes cathode 28, plate 30 and grid 32 and has an output circuit extending between the cathode and plate including the cathode resistor 26 and the plate supply voltage source B+ and the input terminals are the grid 32 and ground. The output terminals of the auction cathode follower 10 are taken across the cathode resistor 26.

The signal voltage source $E_1(f_1)$, having a constant amplitude $E_1$ and variable frequency $f_1$ corresponding to the value of the first variable data quantity, is connected in the input circuit of the tube 16 through a clamping circuit 34 which operates to hold the signal voltage $E_1$ at a fixed direct current voltage level. The clamping circuit 34 comprises a series condenser 36, a shunt resistor 38, and a shunt rectifier or diode 40 having its anode connected to ground to provide a polarity corresponding to positive clamping. The output voltage of the clamping circuit is derived across the resistor 38 and applied to the input terminals or grid 22 and ground of the tube 16. The signal voltage source $E_2$ develops a direct current signal voltage amplitude $E_2$ corresponding to the value of the second variable data quantity and is connected across a resistor 44 which, in turn, is serially connected with a bias voltage source 42 of value $E_c$ across the input terminals or grid 32 and ground of tube 18. The bias voltage source 42 has its negative terminal connected to ground and its positive terminal connected to the positive terminal of resistor 44 to provide a voltage on the grid 32 corresponding to the difference between the bias voltage $E_c$ and the signal voltage $E_2$. The value of the bias voltage $E_c$ is adjusted to be equal to the constant peak-to-peak amplitude of signal voltage $E_1$. In a manner to be described presently the auction cathode follower 10 develops an output voltage across cathode resistor 26 having an amplitude $E_2$ and frequency $f_1$.

The input terminals of the count rate circuit 12 are connected across the cathode resistor 26 to integrate the output voltage of the auction cathode follower 10. The count rate circuit comprises a condenser 46, a series rectifier or diode 48, and parallel resistor 50 and condenser 52 connected across the resistor 26. The condenser 46 has a capacitance value so that it will become fully charged during each input pulse and the diode 48 is connected with a polarity to conduct positive pulses in the forward direction and to isolate the condenser 52 during the interval between pulses. A discharge path for condenser 46 is provided through a rectifier or diode 54 and the cathode resistor 56 of the succeeding differential cathode follower 14 to ground. This arrangement holds the anode of diode 48 at a positive potential above ground, as developed across the cathode resistor 56, and thus provides improved linearity of operation of diode 48. The count rate circuit 12 operates to develop an output signal voltage component across condenser 52 corresponding to the time average value of the product of the input pulse amplitude and frequency. An additional direct current component of constant value is developed due to the Edison effect in the diode 48.

In order to develop an output current corresponding to the signal voltage component output of the count rate circuit 12, the differential cathode follower 14 is employed. The differential cathode follower comprises a pair of amplifying devices or electron tubes 58 and 60. The tube 58 includes a cathode 62, a plate 64, and a grid 66 and is connected in cathode follower circuit configuration including the cathode resistor 56 and plate supply voltage source B+. The tube 60 includes cathode 68, plate 70, and grid 72 and is connected with cathode resistor 74 and plate supply voltage source B+ in a cathode follower circuit configuration. A voltage divider resistor 75 is connected between the positive terminal of the source B+ and ground and has its movable contact connected to the grid 72. The movable contact is adjusted to develop a current through tube 60 so that the voltage across cathode resistor 74 is equal to the direct current voltage component in the output voltage of the count rate circuit 12. The differential voltage across the cathode resistors 56 and 74 thus corresponds to the signal voltage component of the output voltage of the count rate circuit 12. Accordingly, a meter 76 or other utilization device is connected across these cathode resistors and carries an output current corresponding to the signal voltage component. The meter 76 is suitably calibrated to indicate the value of the product of the input signal frequency $f_1$ and the input signal voltage $E_2$.

In operation, the bias voltage source 42 of auction cathode follower 10 is adjusted so that the bias voltage $E_c$ is equal to the peak-to-peak value of signal voltage $E_1$. The auction cathode follower operates in a well known manner to develop a voltage across the cathode resistor 26 corresponding in amplitude to that of the more positive of the grid voltages. with the signal voltage source $E_1(f_1)$ connected as shown and in the absence of signal voltage source $E_2$, the voltage across resistor 26 will be a direct current voltage corresponding to $E_c$ and no alternating current component will be present. When the signal voltage source $E_2$ is connected as shown, the voltage applied to the grid 32 will become less positive by the value of voltage $E_2$ and, accordingly, the voltage across cathode resistor 26 follows the voltage $E_1$ when it exceeds the difference between $E_c$ and $E_2$. As a result, the output voltage across cathode resistor 26 has an alternating current component having an amplitude $E_2$ and a frequency $f_1$. This voltage is applied to the count rate circuit 12 which produces, across the condenser 52, an output direct current voltage $E_3$ having a signal voltage component proportional to the product of $f_1$ and $E_2$ and having a steady state or Edison effect component of constant value $k_2$. The differential cathode follower operates to eliminate the component $k_2$ and to develop a signal current $i$ proportional to the signal voltage component which thus represents the product of $f_1$ and $E_2$.

Figure 3:
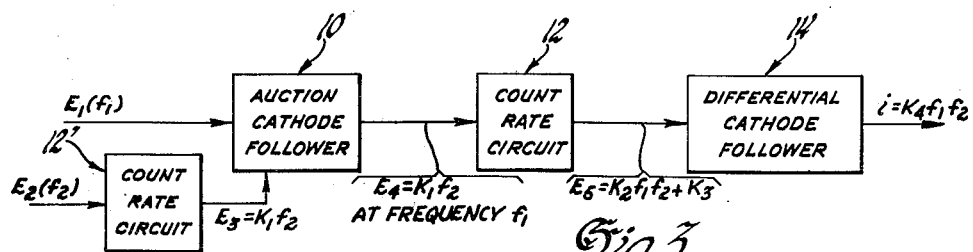
FIGURE 3 is a block diagram of a multiplier circuit for obtaining the product of two frequencies.
Figure 4:
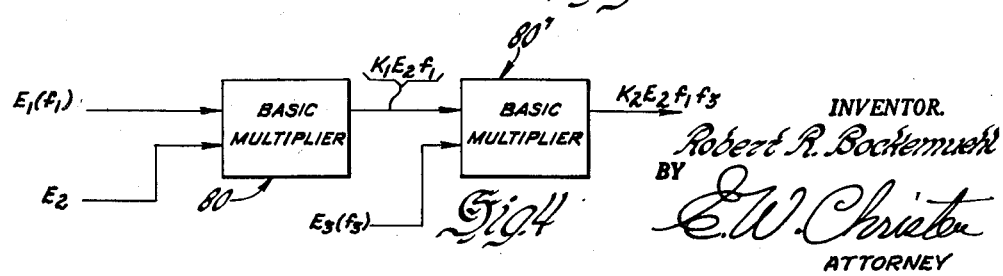
FIGURE 4 is a block diagram of a multiplier circuit for obtaining the product of three different quantities.

FIGURES 3 and 4 illustrate additional circuit arrangements for utilizing the inventive multiplying circuit. Where it is desired to develop a signal voltage and current corresponding to the product of two signal frequencies $f_1$ and $f_2$, the arrangement of FIGURE 3 may be used. A signal voltage source $E_1(f_1)$ of constant amplitude $E_1$ and variable frequency $f_1$ is applied to one pair of input terminals of the auction cathode follower 10. The other signal voltage source $E_2(f_2)$ of constant voltage $E_2$ and variable frequency $f_2$ is applied to a count rate circuit 12' which may be identical to the previously described count rate circuit 12. The circuit 12' develops a direct current output voltage $E_3$ having an amplitude proportional to frequency $f_2$ and this voltage is applied to the other pair of input terminals of the auction cathode follower 10. Accordingly, the auction cathode follower develops an output voltage $E_4$ having a frequency of $f_1$ and an amplitude proportional to the frequency $f_2$. This voltage $E_4$ is applied to the input terminals of the count rate circuit 12 which develops an output voltage $E_5$ having a signal voltage component proportional in amplitude to the product of frequency $f_1$ and frequency $f_2$ and a direct current voltage component $k_3$ of constant value. The voltage $E_5$ is applied to the input terminals of the differential cathode follower 14 which develops an output current $i$ porportional to the product of the frequency $f_1$ and the frequency $f_2$.

Where it is desired to obtain an output voltage and current corresponding to the product of more than two data quantities, the basic multiplying circuit, as illustrated in FIGURE 2, may be cascaded, as shown in FIGURE 4. The signal voltage source $E_1(f_1)$ is applied to one pair of input terminals of the basic multiplier circuit 80 and the signal voltage source $E_2$ is connected to the other pair of input terminals to develop an output voltage proportional in amplitude to the product of the voltage $E_2$ and the frequency $f_1$. This output voltage is applied to one pair of input terminals of the succeeding basic multiplier circuit 80' while the additional voltage source $E_3(f_3)$ of constant amplitude $E_3$ and variable frequency $f_3$ is connected to the other pair of input terminals. Accordingly, the basic multiplier circuit 80' develops an output voltage and current proportional in amplitude to the product of the variable voltage $E_2$, variable frequency $f_1$, and the variable frequency $f_3$.

Although the description of this invention has been given with respect to a particular embodiment, it is not to be construed in a limiting sense. Numerous modifications and variations within the spirit and scope of the invention will now occur to those skilled in the art. For a definition of the invention, reference is made to the appended claims.

I claim:

1. A multiplying circuit for obtaining a voltage proportional to the product of two data quantities, said circuit comprising a signal voltage source developing a voltage of constant amplitude and of variable frequency corresponding to the value of one data quantity, a signal voltage source developing a direct current voltage having a variable amplitude corresponding to the value of another data quantity, means interconnecting said sources and developing a variable signal voltage having said variable amplitude and said variable frequency, and integrating means connected with the last mentioned means and responsive to said variable signal voltage for developing an output voltage corresponding in amplitude to the product of said variable amplitude and said variable frequency.

2. A multiplying circuit comprising an auction cathode follower, means for applying to one pair of input terminals of the auction cathode follower a signal voltage having a predetermined amplitude relative to a fixed direct current value and having a variable frequency, means for applying to the other pair of input terminals of the auction cathode follower a signal voltage of lesser amplitude than said predetermined amplitude by a variable amplitude value whereby a voltage is developed across the output terminals of the auction cathode follower having the said variable frequency and said variable amplitude value, and a count rate circuit connected across said output terminals for developing a voltage having an amplitude corresponding to the product of the variable frequency and the variable amplitude value.

3. A multiplying circuit comprising a clamping circuit having its input terminals adapted to receive a signal voltage of predetermined amplitude and variable frequency, an auction cathode follower having one pair of input terminals connected across the output terminals of the clamping circuit, a bias voltage source which develops a voltage equal to said predetermined amplitude and a direct current signal voltage source of variable amplitude serially connected across the other input terminals of said auction cathode follower whereby a voltage is developed across the output terminals thereof having the said variable frequency and said variable amplitude, and a count rate circuit having its input terminals connected across the output terminals of the auction cathode follower for developing a voltage having an amplitude corresponding to the product of said variable frequency and said variable amplitude.

4. A multiplying circuit comprising a first signal voltage source of predetermined amplitude and variable frequency, a clamping circuit including a serially connected rectifier and condenser connected across the source and a resistor connected across the rectifier, an auction cathode follower including a pair of amplifying devices each having cathode, anode, and control electrodes, said anode electrodes being connected together and to one terminal of a supply voltage source having its other terminal connected to ground, said cathode electrodes being connected together through an output resistor to ground, the input circuit of one amplifying device extending between its control electrode and ground and including the resistor of said clamping circuit, a second signal voltage source including a bias voltage source of said predetermined amplitude and a variable amplitude voltage source connected differentially, the input circuit of the other amplifying device extending from its control electrode to ground and including said second signal voltage source whereby the voltage across said output resistor is of said variable frequency and said variable amplitude, and a count rate circuit connected across said output resistor for developing a voltage having an amplitude corresponding to the product of the variable frequency and the variable amplitude.

5. A multiplying circuit comprising a clamping circuit having its input terminals adapted to receive a signal voltage of predetermined amplitude and variable frequency, an auction cathode follower having one pair of input terminals connected across the output terminals of the clamping circuit, a bias voltage source which develops a voltage equal to said predetermined amplitude and a direct current signal voltage source of variable amplitude serially connected across the other input terminals of said auction cathode follower whereby a voltage is developed across the output terminals thereof having the said variable frequency and said variable amplitude, and a count rate circuit having its input terminals connected across the output terminals of the auction cathode follower for developing a voltage having an amplitude corresponding to the product of said variable frequency and said variable amplitude, a cathode follower having its input terminals connected across the output terminals of the count rate circuit, and utilization means connected across the output terminals of the differential cathode follower.

6. A multiplying circuit comprising a first signal voltage source of predetermined amplitude and variable frequency, a clamping circuit including a serially connected rectifier and condenser connected across the source and a resistor connected across the rectifier, an auction cathode follower including a pair of amplifying devices each having cathode, anode, and control electrodes, said anode electrodes being connected together and to one terminal of a supply voltage source having its other terminal connected to ground, said cathode electrodes being connected together through an output resistor to ground, the input circuit of one amplifying device extending between its control electrode and ground and including the resistor of said clamping circuit, a second signal voltage source including a bias voltage source of said predetermined amplitude and a variable amplitude voltage source connected differentially, the input circuit of the other amplifying device extending from its control electrode to ground and including said second signal voltage source whereby the voltage across said output resistor is of said variable frequency and said variable amplitude, a count rate circuit including a first condenser, a rectifier, and a parallel connected resistor and second condenser connected across the output resistor for developing a voltage across the second condenser having an amplitude corresponding to the product of said variable frequency and said variable amplitude, and a cathode follower having its input terminals connected across the second condenser.

7. A multiplying circuit comprising a first signal voltage source of predetermined amplitude and variable frequency, a clamping circuit including a serially connected rectifier and condenser connected across the source and a resistor connected across the rectifier, an auction cathode follower including a pair of amplifying devices each having cathode, anode, and control electrodes, said anode electrodes being connected together and to one terminal of a supply voltage source having its other terminal connected to ground, said cathode electrodes being connected together through an output resistor to ground, the input circuit of one amplifying device extending between its control electrode and ground and including the resistor of said clamping circuit, a second signal voltage source including a bias voltage source of said predetermined amplitude and a variable amplitude voltage source connected differentially, the input circuit of the other amplifying device extending from its control electrode to ground and including said second signal voltage source whereby the voltage across said output resistor is of said variable frequency and said variable amplitude, a count rate circuit including a first condenser, a rectifier, and a parallel connected resistor and second condenser connected across the output resistor for developing a voltage across the second condenser having an amplitude corresponding to the product of said variable frequency and said variable amplitude, a differential cathode follower including a cathode resistor, and a rectifier connected between the junction of the first condenser and the first mentioned rectifier and a point intermediate the cathode resistor and the cathode of said differential cathode follower.

References Cited in the file of this patent
UNITED STATES PATENTS
2,519,223     Cheek _____ Aug. 15, 1950